US009888132B2

United States Patent
Shibao

(10) Patent No.: US 9,888,132 B2
(45) Date of Patent: Feb. 6, 2018

(54) PORTABLE TERMINAL PERFORMING A PRINTER SEARCH BY USING BLUETOOTH

(71) Applicant: CANON KABUSHIKI KAISHA, Tokyo (JP)

(72) Inventor: Mayumi Shibao, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/288,950

(22) Filed: Oct. 7, 2016

(65) Prior Publication Data

US 2017/0104880 A1   Apr. 13, 2017

(30) Foreign Application Priority Data

Oct. 13, 2015   (JP) .................................. 2015-202247

(51) Int. Cl.
  *H04N 1/00*   (2006.01)
  *H04N 1/32*   (2006.01)

(52) U.S. Cl.
  CPC ..... *H04N 1/00106* (2013.01); *H04N 1/00307* (2013.01); *H04N 1/32101* (2013.01); *H04N 2201/006* (2013.01); *H04N 2201/0091* (2013.01); *H04N 2201/3205* (2013.01)

(58) Field of Classification Search
  CPC ........................ H04N 1/00106; H04N 1/00307
  See application file for complete search history.

(56) References Cited

U.S. PATENT DOCUMENTS

| 2012/0075485 A1* | 3/2012 | Mizutani | ............. | H04M 1/7253 |
| | | | | 348/207.1 |
| 2012/0113465 A1* | 5/2012 | Matsuyama | .......... | G06F 3/1205 |
| | | | | 358/1.15 |
| 2014/0302849 A1* | 10/2014 | Palin | ..................... | H04W 8/005 |
| | | | | 455/436 |

FOREIGN PATENT DOCUMENTS

| JP | 2005-104595 A | 4/2005 |
|---|---|---|
| JP | 2005-210328 A | 8/2005 |
| JP | 2009-211519 A | 9/2009 |
| JP | 2013-162381 A | 8/2013 |
| JP | 2015-159459 A | 9/2015 |

* cited by examiner

*Primary Examiner* — Ibrahim Siddo
(74) *Attorney, Agent, or Firm* — Canon U.S.A., Inc. IP Division

(57) ABSTRACT

A portable terminal performs a printer search using Bluetooth®. In a case where communication different from Bluetooth® communication can be performed between the portable terminal and a particular printer, he portable terminal displays those printing apparatuses found by the search that are able to communicate via a different communication. Those printing apparatuses found by the search that just communicate via Bluetooth® are not displayed.

13 Claims, 8 Drawing Sheets

PORTABLE TERMINAL PERFORMING A PRINTER SEARCH BY USING BLUETOOTH

BACKGROUND

Field

Aspects of the present invention relate to a portable terminal that performs a printer search using Bluetooth®.

Description of the Related Art

To issue a print instruction from a mobile terminal, a user has to select a printing apparatus on the mobile terminal's display. To enable a user to select a printing apparatus, the mobile terminal searches for printing apparatuses, and displays the result of the search. As a means for searching for printing apparatuses from a mobile terminal, a method of determining the sequential order of the connection requests of plural printers based on search signal intensity is disclosed in Japanese Patent Laid-Open No. 2013-162381. A mobile terminal, for example, can receive a Bluetooth® signal from a device, such as printing device, where the device advertises information associated with the device via the Bluetooth® signal (hereinafter referred to as "Advertise of Bluetooth" or "Advertise"). The mobile terminal, upon receipt of the Bluetooth® signal, adds the printing devices providing the Bluetooth® signal into a printer list in the descending order of radio wave intensity. The user selects one printing apparatus from among those in the printer list displayed on the mobile terminal, and issues an instruction for execution of print processing.

When printing is performed using near-field wireless communication, such as Bluetooth®, the speed of communication is lower than in a case where a wireless LAN is used. Therefore, there is a method of, after performing a printer search by using near-field wireless communication, transmitting print data by switching to wireless LAN. However, in some cases, the printer found as a result of a near-field wireless search cannot perform wireless LAN communication, though it can use its near-field wireless function. Examples of such cases include where a wireless LAN setting is OFF in the printer, the printer is out of order, or the printer is on a different subnetwork than the mobile terminal. In such cases, the printer found via near-field wireless communication cannot actually be used for printing.

SUMMARY

According to an aspect of the present disclosure, a portable terminal that searches for at least one printing apparatus using Bluetooth® and transmits print data to the printing apparatus via a communication different from Bluetooth® communication includes a memory, and a processor that executes instructions stored in the memory to search for the printing apparatus using Bluetooth®, determine whether it is possible to perform the communication different from the Bluetooth® communication between the at least one printing apparatus found by the search and the portable terminal, and display the at least one printing apparatus found by the search as a search result in a case where it is determined that it is possible to perform the communication different from the Bluetooth® communication between the at least one printing apparatus found by the search and the portable terminal, wherein the at least one printing apparatus found by the search is not displayed as the search result in a case where it is determined that it is not possible to perform the communication different from the Bluetooth® communication between the at least one printing apparatus found by the search and the portable terminal.

Further features of aspects of the present invention will become apparent from the following description of exemplary embodiments with reference to the attached drawings.

DESCRIPTION OF THE EMBODIMENTS

With reference to the accompanying drawings, exemplary embodiments of the present invention will now be explained.

First Embodiment

Figure 1:
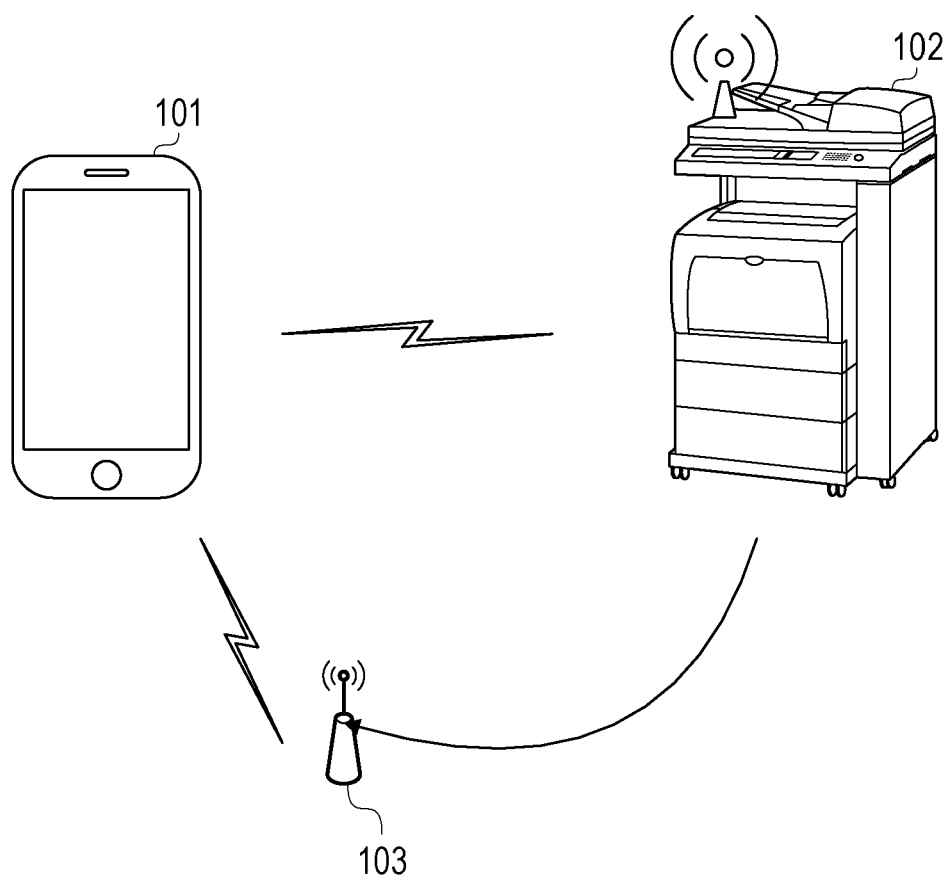
FIG. 1 is a diagram that illustrates an example of the system configuration of an information processing system.

FIG. 1 is a diagram that illustrates an example of the system configuration of an information processing system. In FIG. 1, each of a portable terminal 101, a printing apparatus 102, and an access point 103 is capable of performing communication via the corresponding communication medium. The system configuration illustrated in FIG. 1 is just an example. Therefore, the portable terminal 101 can be any kind of information equipment. In FIG. 1, for simplicity purposes, only a single printing apparatus is illustrated. However, it is assumed herein that the information processing system includes a plurality of printing apparatuses.

Figure 2:
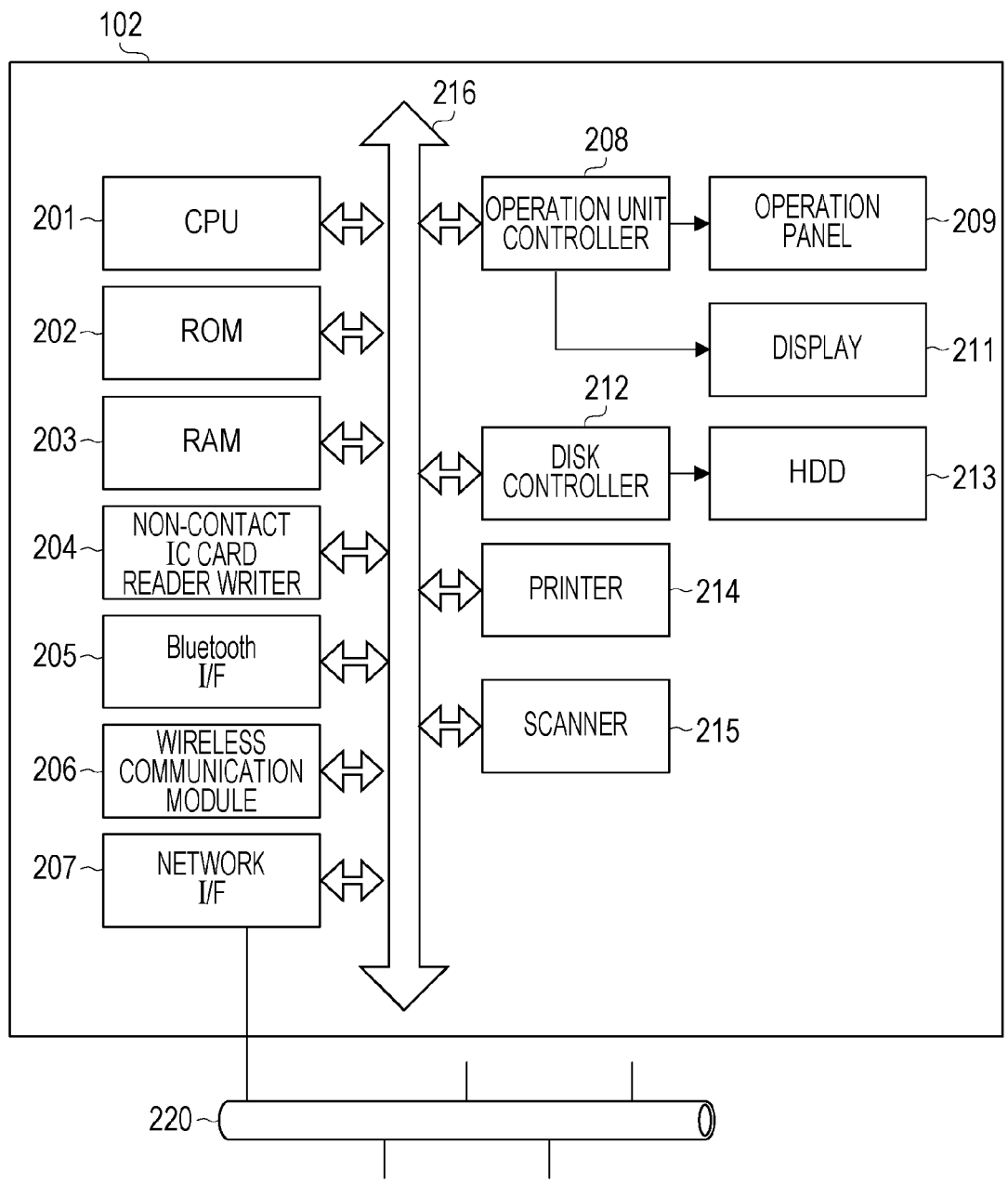
FIG. 2 is a diagram that illustrates an example of the hardware configuration of a printing apparatus.

FIG. 2 is a diagram that illustrates an example of the hardware configuration of the printing apparatus 102. The printing apparatus 102 includes a CPU 201, which executes programs stored in a ROM 202 or, for example, in a hard disk drive (HDD) 213. The CPU 201 centrally controls each of devices connected to a system bus 216.

A RAM 203 functions as the main memory, work area, etc. of the CPU 201. An operation unit controller 208 controls various buttons provided on the printing apparatus 102 or an operation panel 209, a display 211, etc. A disk controller 212 controls the HDD 213.

A network I/F 207 exchanges data bi-directionally with other network equipment or a file server, etc. via a network 220. A wireless communication module 206 connects to the network 220 via an access point for bidirectional data exchange with other network equipment or a file server, etc. when operating in an infrastructure mode. When operating in a soft AP mode, the wireless communication module 206 causes the printing apparatus to operate as an access point so as to establish a direct connection for wireless communication with a portable terminal.

A printer 214 is a print unit that performs electro-photographic printing on paper. The method of printing is not limited to electro-photographic printing.

A scanner 215 is an image reader for reading an image printed on paper. In many cases, an ADF (Automatic Document Feeder) is mounted as an optional unit on the scanner 215. With an ADF, reading of plural sheets of an original document is accomplished automatically.

The HDD 213 can be used as a place for temporary storage of images in certain instances.

The printing apparatus 102 is capable of exchanging data with various peripheral devices via a non-contact IC card reader writer 204 and a Bluetooth® I/F 205.

The CPU 201 performs processing based on programs stored in the ROM 202 or the HDD 213. The functions of the printing apparatus 102 are realized by this means.

Figure 3:
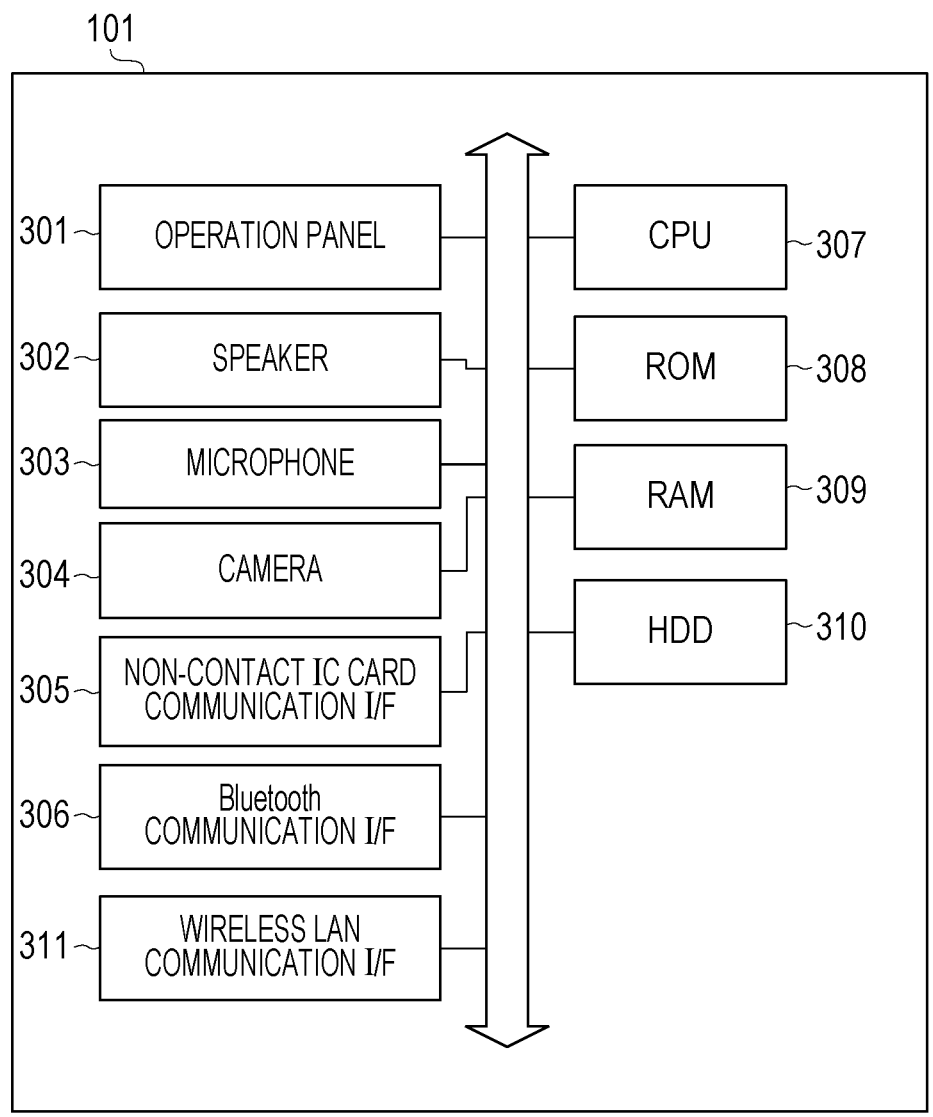
FIG. 3 is a diagram that illustrates an example of the hardware configuration of a portable terminal.

FIG. 3 is a diagram that illustrates an example of the hardware configuration of the portable terminal 101. In the present embodiment, the terminal 101 is assumed to be a portable device such as a smartphone, a tablet PC, etc. However, it can be any kind of an information processing apparatus that is capable of transmitting print data, etc. to a printing apparatus.

A CPU 307 reads programs stored in a ROM 308 to perform various kinds of processing for controlling the operation of the portable terminal 101. Programs are stored in the ROM 308. A RAM 309 is used as a temporary storage area such as the work area, main memory, etc. of the CPU 307. Various kinds of data, etc. such as photos and electronic documents, etc. are stored in the HDD 310.

An operation panel 301 includes a touch panel function to detect a user's touch operation. The operation panel 301 displays various kinds of screens presented by the operating systems, as well as an e-mail transmission application. By touch-operating the operation panel 301, a user can input an operational instruction into the portable terminal 101. The portable terminal 101 can include hardware keys. In this case, the user can input an operational instruction into the portable terminal 101 using the hardware keys.

A user's uses speaker 302 and a microphone 303 when using the portable terminal 101 for telephone conversations. A camera 304 captures an image in response to an image-capturing instruction provided by a user. A photo image captured by the camera 304 is stored in a predetermined area of the HDD 310.

The portable terminal 101 exchanges data with various peripheral devices via a non-contact IC card communication I/F 305, a Bluetooth® communication I/F 306, and a wireless LAN communication I/F 311. Bluetooth® is one type of near-field wireless communication. While Bluetooth® is used as the example of near-field wireless communication in the present embodiment, any other type of near-field wireless communication, for example, ZigBee, can be used. Wireless LAN is an example of wireless communication used for transmitting print data.

Figure 8:
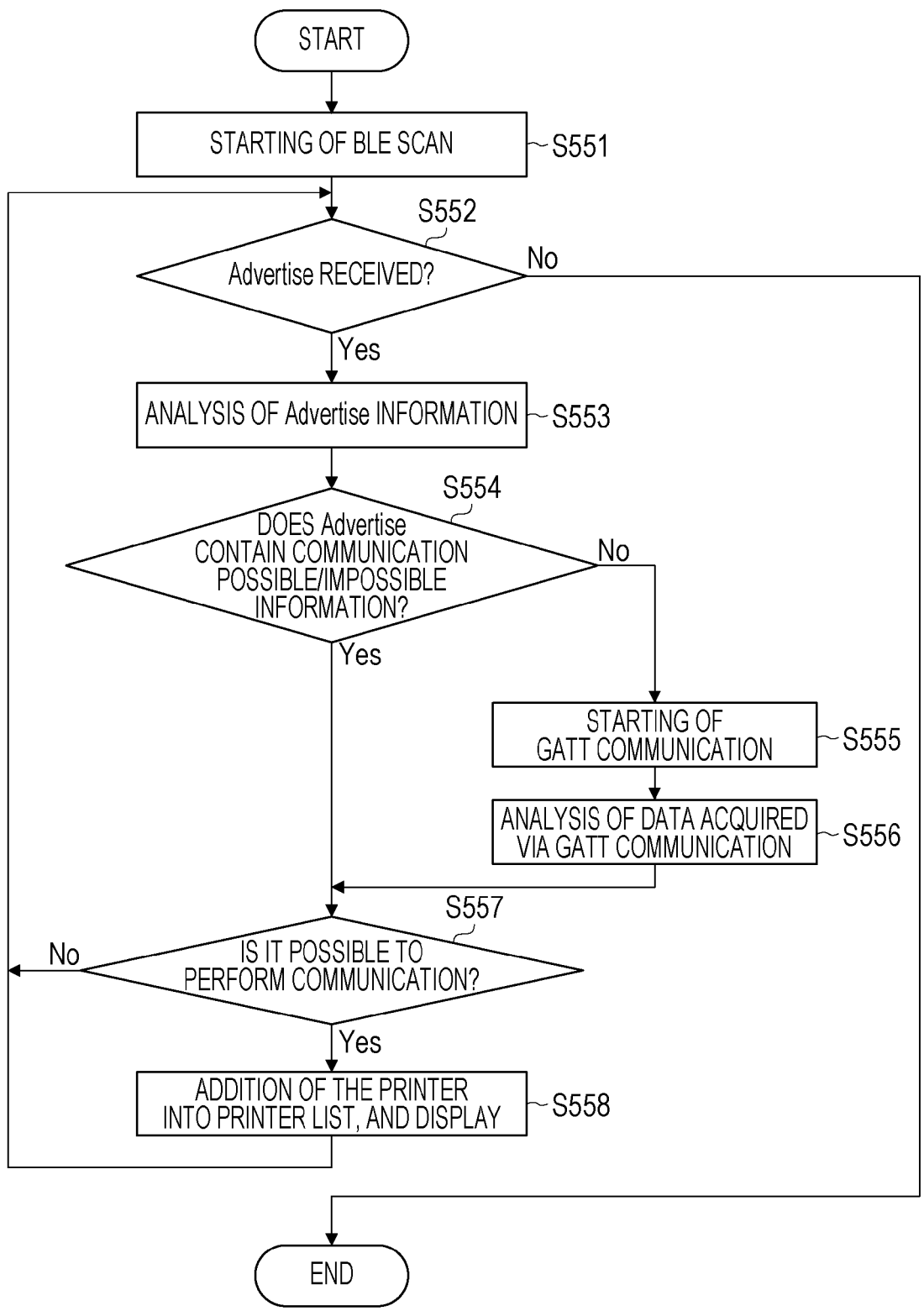
FIG. 8 is a flowchart that illustrates an example of information processing performed by the portable terminal.

The functions of the portable terminal 101, and the processing in the flowchart illustrated in FIG. 8 as described below, are realized by performing, by the CPU 307, processing based on the programs stored in the ROM 308 or the HDD 310.

Next, examples of screens displayed on the portable terminal 101 will be described with reference to FIGS. 4 and 5.

Figure 4:
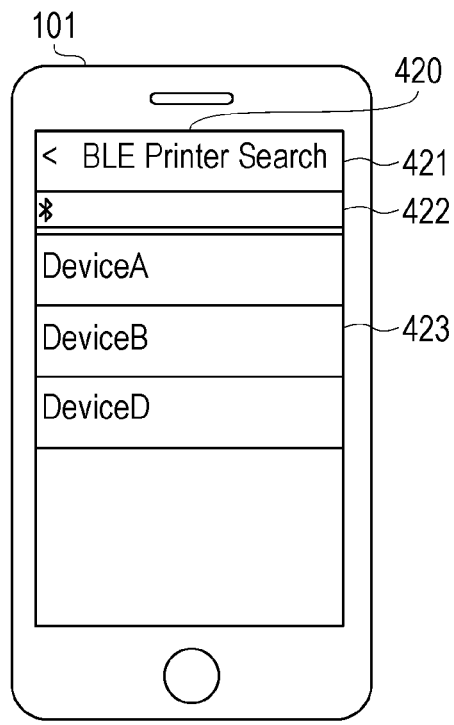
FIG. 4 is a diagram that illustrates an example of a search screen according to a first embodiment.

FIG. 4 is a diagram that illustrates an example of a search screen 420 for searching for and displaying printing apparatuses using Bluetooth®. A title showing that the screen is for a Bluetooth® search is displayed in a screen title 421. A mark indicating that a Bluetooth® search is being performed is displayed in a network name 422. Printing apparatuses found as a result of the Bluetooth® search are displayed, in list format, in a search result list 423. In a Bluetooth® search, information that can be acquired by means of Advertise is limited. Therefore, among the device names of printing apparatuses that can be acquired and MAC addresses thereof, the CPU 307 causes the display to show the device names of the printing apparatuses on the screen.

In the example illustrated in FIG. 4, from among the plural printing apparatuses found, the CPU 307 causes the display to show the device names of the printing apparatuses in sequential order based on distance from the portable terminal 101, with the nearest printing apparatus shown at the top of the list. When the selection of the device name of a printing apparatus from among those in the search result list 423 by the user is detected, the CPU 307 commands that a registered device list screen illustrated in FIG. 5 described below be displayed on the operation panel 301.

Figure 5:
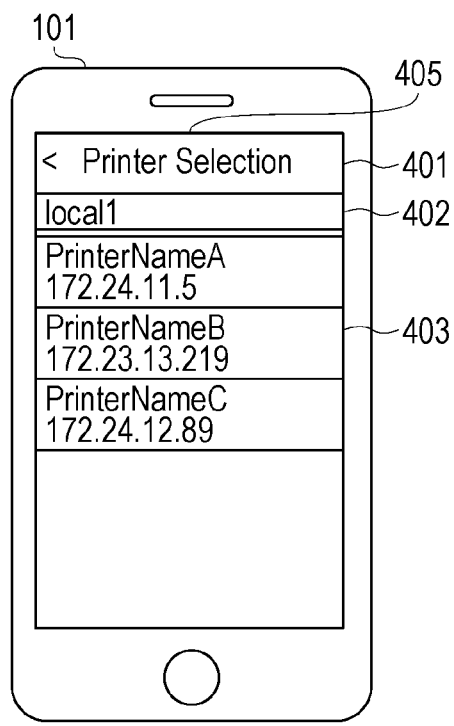
FIG. 5 is a diagram that illustrates an example of a registered device list screen.

FIG. 5 is a diagram that illustrates an example of a registered device list screen 405. A title showing that it is a list of devices that have been registered by the user is displayed in a screen title 401. A wireless LAN network name is displayed in a network name 402 to inform the user to which network the user's terminal is currently connected. The registered printing apparatuses selected by the user in FIG. 4 are displayed in a registered device list 403. The device names of printing apparatuses whose detailed information has already been acquired by using wireless LAN and attribute information thereof, such as IP addresses, etc., are displayed in the registered printing apparatus list.

Figure 6:
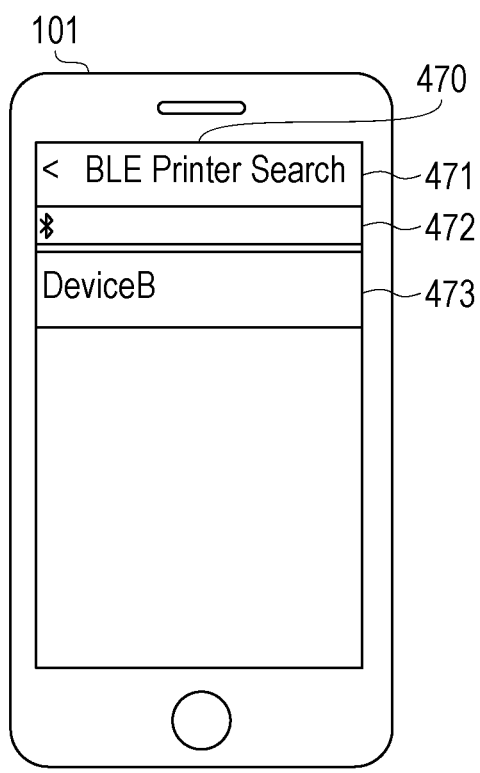
FIG. 6 is a diagram that illustrates another example of a search screen according to the first embodiment.

FIG. 6 is a diagram that illustrates an example of a search screen 470, which is modified from the search screen 420 illustrated in FIG. 4. For example, in a case where a setting file stored in the HDD 310, etc. contains screening setting for narrowing down printers to be displayed, the CPU 307 controls the display such that the search screen illustrated in FIG. 6 is displayed on the operation panel 301 instead of the search screen illustrated in FIG. 4. For example, a title that shows that it is a screen for a Bluetooth® search is displayed in a screen title 471. A mark that indicating that a Bluetooth® search is being performed is displayed in a network name 472.

From among plural printing apparatuses found as a result of Bluetooth® search, the nearest printing apparatus is displayed in a search result list 473. The CPU 307 calculates each distance from the portable terminal 101 based on the intensity of the Bluetooth® radio waves. In the present embodiment, the CPU 307 uses the distance between the portable terminal 101 and each printing apparatus to narrow-down to display a single printing apparatus.

However, the condition for narrowing-down to one printing apparatus is not limited thereto. Other conditions can be employed. For example, the printer apparatus of the most recent selection, or the printer apparatus used most frequently based on use history can be displayed. The number of printing apparatuses in narrowing-down is not limited to one. The number can be reduced based on a number set in the setting file, etc. In accordance with information inputted via the operation panel 301 or the microphone 303, the CPU 307 sets or changes the condition of the setting file stored in the HDD 310, etc.

Figure 7:
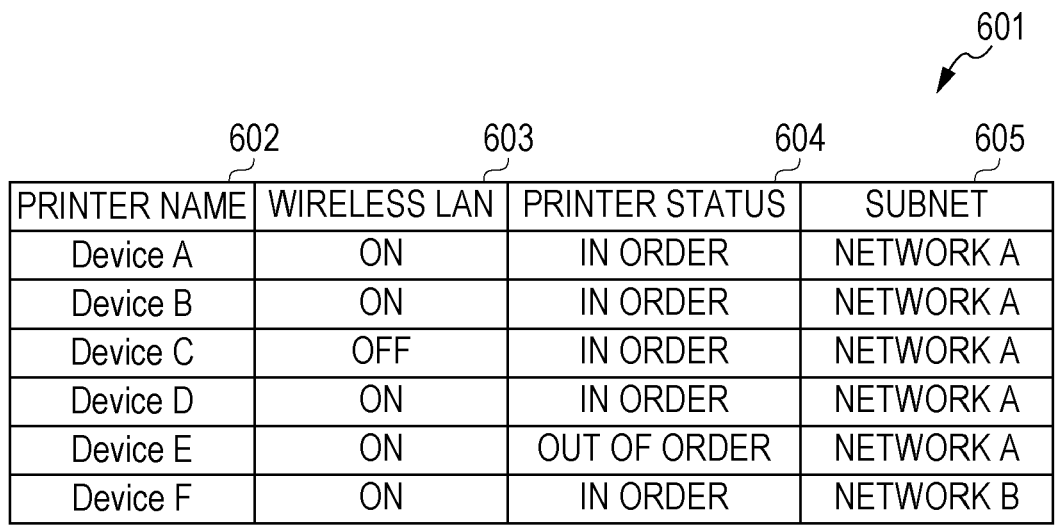
FIG. 7 is a diagram that illustrates an example of a device status table.

FIG. 7 is a diagram that illustrates an example of a device status table 601, which shows the statuses of printing apparatuses. The device status table 601 is stored in the RAM 309 or the HDD 310, etc. The device status table 601 includes printer name 602, wireless LAN ON/OFF status 603, printer status 604, and subnet 605. The CPU 307 determines that it is possible to perform communication if all of the following conditions are met: the wireless LAN status 603 is ON in the device status table 601; the printer status 604 is not "out of order"; and, the network in the subnet 605 is the same as the currently used network. In the device status table 601 illustrated as an example in FIG. 7, the CPU 307 determines Device A, Device B, and Device D as printing apparatuses with which it is possible to perform communication.

Next, with reference to the flowchart of FIG. 8, information processing performed by the portable terminal 101 when operation for displaying the search screen 420 is performed will be explained. When operation for displaying the search screen 420 is performed, the CPU 307 starts Bluetooth® scanning. In S552, the CPU 307 determines whether Advertise of Bluetooth® is received. If, for example, Advertise of Bluetooth® is not received within a predetermined period of time (S552: NO), the CPU 307 terminates the processing in the flowchart illustrated in FIG. 8. The process proceeds to S553 if Advertise of Bluetooth® is received (S552: YES).

In S553, the CPU 307 analyzes the information of Advertise. In S554, based on the result of the analysis, the CPU 307 determines whether Advertise contains "communication possible/impossible information". The "communication possible/impossible information" is information regarding whether, for example, wireless LAN is ON (possible) or OFF (not possible).

The CPU 307 creates the device status table 601 illustrated in FIG. 7 by performing communication with the printing apparatus. If the CPU 307 determines that Advertise contains communication possible/impossible information (S554: YES), the process proceeds to S557. If the CPU 307 determines that Advertise does not contain communication possible/impossible information (S554: NO), the process proceeds to S555.

In S557, the CPU 307 determines whether it is possible to perform communication based on the information in the device status table 601. If the CPU 307 determines that it is possible to perform communication (S557: YES), the process proceeds to S558. If the CPU 307 determines that it is not possible to perform communication (S557: NO), the process returns to S552.

In S558, the CPU 307 adds information on the processing target printing apparatus into the printer list in the search screen, and displays the processing target printing apparatus in such a way as to be able to be selected. When this processing is performed, if the setting file, etc. contains screening setting for reducing the number of printers to be displayed, in accordance with the set conditions, the CPU 307 displays the number-reduced printer search screen 470 illustrated in FIG. 6, including printers that meet the set condition from among those in the printer list. If the setting file, etc. does not contain screening setting for reducing the number of printers to be displayed, the CPU 307 displays the printer search screen 420 illustrated in FIG. 4 based on the printer list.

After S558, the CPU 307 returns the process to S552 for receiving Advertise of the next printing apparatus. In S555, the CPU 307 starts GATT communication with the printing apparatus. In S556, the CPU 307 analyzes the received information to acquire communication possible/impossible information. The communication possible/impossible information is information regarding whether, for example, wireless LAN is ON (possible) or OFF (not possible).

As described above, the CPU 307 creates the device status table 601 illustrated in FIG. 7 by performing communication with the printing apparatus. After that, the process proceeds to S557. The CPU 307 determines whether it is possible to perform communication based on the information in the device status table 601.

The processing of the present embodiment addresses the issue of having to redo printer selection when the printer found as a result of a Bluetooth® search cannot be used for printing due to inability to perform communication. This ensures that a user can perform smooth printer registration operation.

Second Embodiment

In the processing of the first embodiment, printing apparatuses found as a result of a Bluetooth® search that can communicate are displayed on a search screen as illustrated in FIG. 4. In other words, in the first embodiment, the portable terminal 101 does not display printing apparatuses that cannot communicate on the search screen. However, the portable terminal 101 can display all printing apparatuses found using a Bluetooth® search on a search screen by making the manner of displaying printing apparatuses that can communicate different from the manner of displaying printing apparatuses that cannot communicate. This processing will be explained in the present embodiment.

Figure 9:
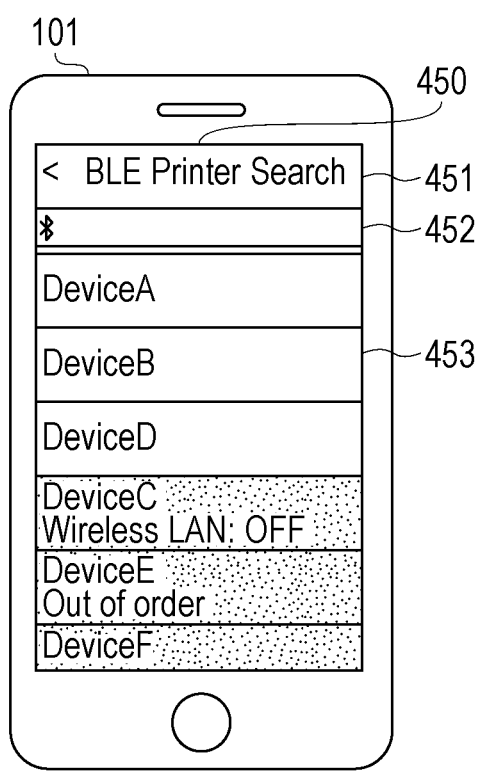
FIG. 9 is a diagram that illustrates an example of a search screen according to a second embodiment.

FIG. 9 is a diagram that illustrates an example of a search screen 450 for searching for and displaying printing apparatuses using Bluetooth®. A title indicating that it is a screen for a Bluetooth® search is displayed in a screen title 451. A mark indicating that a Bluetooth® search is being performed is displayed in a network name 452. Printing apparatuses found as a result of the Bluetooth® search are displayed in a search result list 453. In the present embodiment, the CPU 307 uses different methods to display the list based on each printer's communication status (e.g., possible/impossible) acquired by means of Advertise or GATT in a Bluetooth® search.

For printing apparatuses that are in a state capable of communicating, the CPU 307 performs ordinary processing for displaying these printing apparatuses in the list in a selectable manner. For printing apparatuses that are in a state not capable of communicating, the CPU 307 performs, for example, gray display processing for displaying these printing apparatuses in the list in a non-selectable manner. For each of the printing apparatuses that are in a state not capable of communicating, the CPU 307 displays the reason why the printing apparatus cannot communicate as part of the list.

Display in gray (or gray-out) is an example of displaying printing apparatuses in a non-selectable manner. For example, the CPU 307 can cause printing apparatuses that are in a state not capable of communicating to be displayed in the list in a non-selectable manner, each with an object, etc. that is indicative of a non-selectable state. Alternatively, the CPU 307 can cause printing apparatuses that are in a state not capable of communicating to be displayed in the list in a non-selectable manner in a non-gray color that is different from a color for printing apparatuses that are in a state capable of communicating.

The processing of the present embodiment enables a user to know whether each printing apparatus found as a result of a Bluetooth® search can communicate so that the user can select a printing apparatus that is in a state capable of communication. Since, in the case where the printing apparatus is in a state not capable of communication, the reason why the printing apparatus cannot communicate is provided, is the user can remedy the state not capable of communicating, resulting in improved user operability.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-202247, filed Oct. 13, 2015, which is hereby incorporated by reference herein in its entirety.

What is claimed is:

1. A portable terminal that searches for at least one printing apparatus using Bluetooth® and transmits print data to the at least one printing apparatus via a communication different from Bluetooth® communication, the portable terminal comprising:
a memory; and
a processor that executes instructions stored in the memory to:
search for the at least one printing apparatus using Bluetooth®;
determine whether it is possible to perform the communication different from the Bluetooth® communication between the at least one printing apparatus found by the search and the portable terminal; and
display the at least one printing apparatus found by the search as a search result in a case where it is determined that it is possible to perform the communication different from the Bluetooth® communication between the at least one printing apparatus found by the search and the portable terminal,
wherein the at least one printing apparatus found by the search is not displayed as the search result in a case where it is determined that it is not possible to perform the communication different from the Bluetooth® communication between the at least one printing apparatus found by the search and the portable terminal.

2. The portable terminal according to claim 1, wherein the processor searches for the printing apparatus based on a Bluetooth® signal transmitted by the printing apparatus.

3. The portable terminal according to claim 2, wherein the processor determines whether it is possible to perform the communication different from the Bluetooth® communication between the at least one printing apparatus found by the search and the portable terminal based on information contained in the transmitted Bluetooth® signal.

4. The portable terminal according to claim 1, wherein the processor performs GATT communication with the at least one printing apparatus found by the search; and wherein the processor determines whether it is possible to perform the communication different from the Bluetooth® communication between the at least one printing apparatus found by the search and the portable terminal based on information acquired via the GATT communication.

5. The portable terminal according to claim 1, wherein the search result Is displayed in a sequential order based on proximity of printing apparatuses to the portable terminal.

6. The portable terminal according to claim 1, wherein the search result includes a device name of the at least one printing apparatus found by the search.

7. A method implemented by a portable terminal that searches for at least one printing apparatus using Bluetooth® and transmits print data to the at least one printing apparatus via a communication different from Bluetooth® communication, the method comprising:
searching for the at least one printing apparatus using Bluetooth®;
determining whether it is possible to perform the communication different from the Bluetooth® communication between at least one printing apparatus found by the searching and the portable terminal; and
displaying the at least one printing apparatus found by the searching as a search result in a case where it is determined that it is possible to perform the communication different from the Bluetooth® communication between the at least one printing apparatus found by the searching and the portable terminal,
wherein the at least one printing apparatus found by the searching is not displayed as the search result in a case where it is determined that it is not possible to perform the communication different from the Bluetooth® communication between the at least one printing apparatus found by the searching and the portable terminal.

8. The method according to claim 7,
wherein the printing apparatus is searched for based on a Bluetooth® signal transmitted by the printing apparatus.

9. The method according to claim 8,
wherein determining whether it is possible to perform the communication different from the Bluetooth® communication between the at least one printing apparatus found by the searching and the portable terminal is performed based on information contained in the Bluetooth® signal.

10. The method according to claim 7, further comprising performing GATT communication with the at least one printing apparatus found by the searching, and wherein determining whether it is possible to perform the communication different from the Bluetooth® communication between the at least one printing apparatus found by the searching and the portable terminal is performed based on information acquired via the GATT communication.

11. The method according to claim 7, wherein the search result is displayed in a sequential order based on proximity of printing apparatuses to the portable terminal.

12. The method according to claim 7, wherein, the search result includes a device name of the found printing apparatus.

13. A non-transitory computer readable storage medium storing computer executable instructions that causes a portable terminal that searches for at least one printing apparatus using Bluetooth® and transmits print data to the at least one printing apparatus via a communication different from Bluetooth® communication to execute a method, the method comprising:

searching for the at least one printing apparatus using Bluetooth®;

determining whether it is possible to perform the communication different from the Bluetooth® communication between the at least one printing apparatus found by the searching and the portable terminal; and displaying the at least one printing apparatus found by the searching as a search result in a case where it is determined that it is possible to perform the communication different from the Bluetooth® communication between the at least one printing apparatus found by the searching and the portable terminal, wherein the at least one printing apparatus found by the searching is not displayed as the search result in a case where it is determined that it is not possible to perform the communication different from the Bluetooth® communication between the at least one printing apparatus found by the searching and the portable terminal.

\* \* \* \* \*